United States Patent [19]

Lehrke

[11] Patent Number: 4,725,713

[45] Date of Patent: Feb. 16, 1988

[54] ELECTRICALLY HEATED HOSE EMPLOYING A HOSE SIMULATOR FOR TEMPERATURE CONTROL

[75] Inventor: Kenneth E. Lehrke, Maple Grove, Minn.

[73] Assignee: Graco Inc., Minneapolis, Minn.

[21] Appl. No.: 736,521

[22] Filed: May 20, 1985

Related U.S. Application Data

[63] Continuation of Ser. No. 436,009, Oct. 22, 1982, abandoned.

[51] Int. Cl.$^4$ .................. H05B 1/02; B67D 5/62; F24H 1/10; F16L 53/00
[52] U.S. Cl. ............................ 219/308; 219/301; 219/328; 219/499; 219/505; 219/511; 222/146.5; 236/68 B; 239/133; 239/139; 338/23; 374/134; 374/185
[58] Field of Search ........ 219/296, 300, 301, 306–308, 219/328, 497–501, 505, 511, 494; 222/146.1, 146.5; 236/68 B, 68 C, 68 R, 91 G, 91 R; 239/133, 135; 374/134, 185; 338/22 R, 23

[56] References Cited

U.S. PATENT DOCUMENTS

| | | | |
|---|---|---|---|
| 1,522,122 | 1/1925 | Heidbrink et al. | 219/511 X |
| 1,689,004 | 10/1928 | Ackley | 219/511 X |
| 1,781,244 | 11/1930 | Oswald | 219/222 |
| 2,448,289 | 8/1948 | Anderson | 219/511 |
| 2,518,277 | 8/1950 | Brewer | 219/511 X |
| 2,522,826 | 9/1950 | Hooven | 219/499 |
| 2,553,060 | 5/1951 | Miner | 236/68 B |
| 2,593,459 | 4/1952 | Johnson | 219/511 X |
| 3,062,941 | 11/1962 | White | 219/505 X |
| 3,096,424 | 7/1963 | Cecchini | 219/511 X |
| 3,146,950 | 9/1964 | Lancaster | 219/301 X |
| 3,227,858 | 1/1966 | Rees | 219/497 X |
| 3,246,838 | 4/1966 | Bauer | 219/358 X |
| 3,275,802 | 9/1966 | Vandivere et al. | 219/501 X |
| 3,364,337 | 1/1968 | Kahm | 219/301 X |
| 3,408,008 | 10/1968 | Cocks | 219/301 X |
| 3,531,023 | 9/1970 | Mercer . | |
| 3,585,361 | 6/1971 | Rosen et al. . | |
| 3,803,385 | 4/1974 | Sandorf | 219/301 X |
| 3,897,679 | 8/1975 | Guild | 219/510 |
| 3,976,230 | 8/1976 | Sperry | 222/146 HE |
| 4,031,355 | 6/1977 | Leonik . | |
| 4,194,536 | 3/1980 | Stine et al. | 219/301 X |
| 4,204,612 | 5/1980 | Schrader et al. . | |
| 4,323,174 | 4/1982 | Wood | 219/301 X |

*Primary Examiner*—Anthony Bartis
*Attorney, Agent, or Firm*—Paul L. Sjoquist

[57] ABSTRACT

A system for electrically heating a hose of the type used to transport one or more fluid components from a remote location to a point of application includes at least one fluid conduit and an electric heating element enclosed within a thermal insulation blanket to form a hose construction having predetermined heat transfer characteristics. A remotely positioned module enclosed in a thermal insulation blanket and containing an electric heater and temperature sensor provides a hose simulator having heat transfer characteristics substantially identical to that of the hose. An electrical power drive circuit connected in parallel to the hose heating element and the module heater is controlled by a temperature control circuit responsive to the temperature sensed within the module by the temperature sensor. The temperature control circuit is further responsive to an ambient temperature sensor physically separated from the hose and module.

5 Claims, 8 Drawing Figures

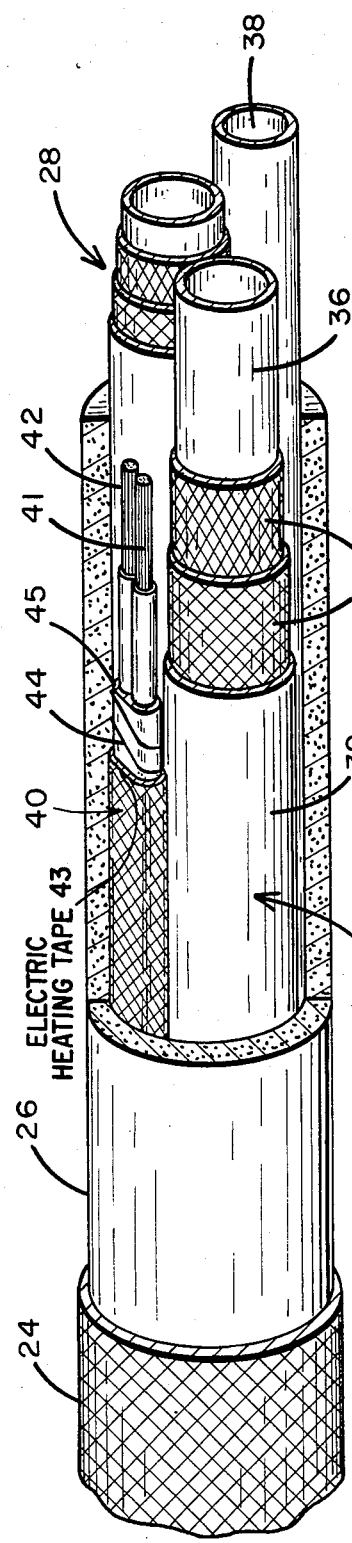
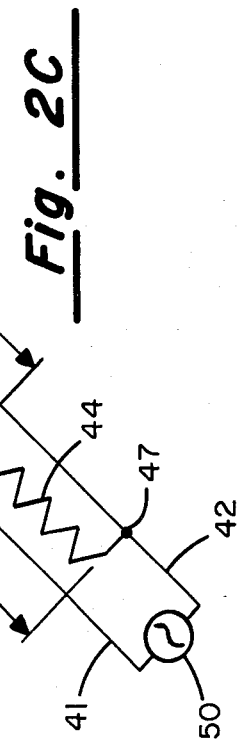
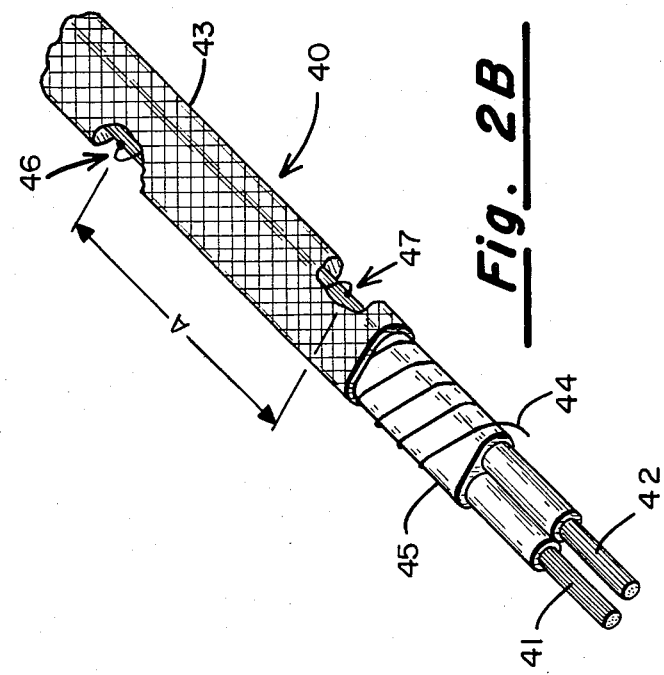

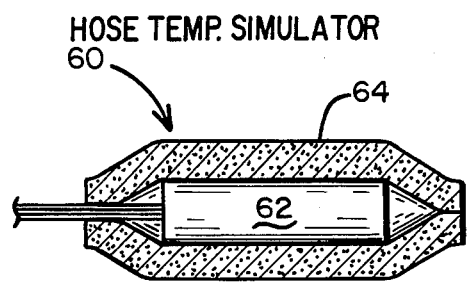
Fig. 3
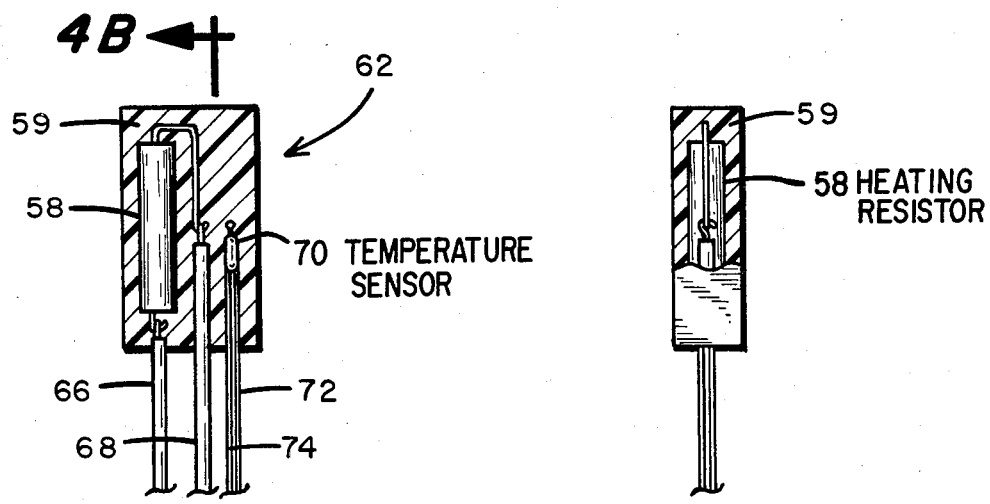
Fig. 4A
Fig. 4B

ELECTRICALLY HEATED HOSE EMPLOYING A HOSE SIMULATOR FOR TEMPERATURE CONTROL

This is a continuation of U.S. application Ser. No. 436,009, filed Oct. 22, 1982, and now abandoned.

BACKGROUND OF THE INVENTION

The present invention relates to a system for heating fluid hose, and more particularly to a system for heating fluid hose in applications wherein one or more fluid components are delivered through the hose from a remote location to a point of application.

The invention is particularly adaptable for systems requiring close temperature control over liquid components such as multiple component coatings which are separately delivered to a point of application, and are mixed and applied from a common applicator or spray gun. Systems of this type generally require fairly precise control over the temperature of the delivered fluid, and the quality of coating application is dependent upon both the temperature of the liquid components and the temperature of the surface to which the components are mixed and applied. Such systems may be found in industrial plant installations, wherein the liquid temperature at the point of application is at least somewhat controllable by monitoring the industrial plant ambient temperature. However, such systems are also useful for coating applications in an outdoors environment. For example, such systems are utilized in the application of plural component urethane and other foam materials for the application of roof coatings on buildings. In this latter case, the coating application problem becomes complicated in a number of important respects. First, the components typically applied in such applications are generally quite temperature responsive and sensitive, and for optimum coating quality these temperatures should be closely controlled. Further, the quality of coating is significantly affected by the temperature of the surface which receives the coating, and in the case of building roofs may be higher than, but proportional to the ambient air temperature. Still further, the nature of a practical roof coating application requires that hose lenqths extend for considerable distances, and be very ruggedly constructed because of the physical abuse the equipment suffers in hauling it to the point of application. At the same time, the liquid materials flowing through the hoses must be kept at a constant temperature, within a fairly narrow range, in order to insure that the temperature of the liquid at the point of mixing and application of the fluids be reasonably well-defined. Because of the physical abuse that the hoses tend to take over use, it is very difficult to construct an intricate temperature sensing mechanism into the hose itself. Further, because of the widely ranging requirements for conveying the liquids over greater or shorter distances, it is convenient to provide such hose in sections, in convenient lengths of twenty-five or fifty feet. Thus, hose couplers must be provided at both ends of each extension length, capable of connecting all of the liquid, air, and electrical circuits together reliably. If hose extension lengths must also carry temperature sensing circuits, electrical connections for these circuits must also be provided and such circuits must be ruggedly packaged in each extension length of hose.

There is a need for a system for delivering heated liquid through extended hose lengths, wherein the hose is heated to carefully control the temperature of the liquid being delivered, and wherein the temperature control and monitoring system may be safely contained to reliably operate under adverse environmental conditions. Further, there is a need for a heated hose temperature control system which takes into account the ambient temperature conditions at or near the point of application in adjusting the liquid temperature being delivered to the point of application. It is a principal object of the present invention to provide a system meeting these needs to enable liquid coatings to be applied under optimum application conditions.

SUMMARY OF THE INVENTION

The present invention includes a system for electrically heating a fluid hose, wherein the hose may carry one or more components and a supply of pressurized air, all to a point of application, preferably through a spray gun. The system includes a hose having an electrically energizable heating element along its length and in close proximity to the hose fluid conduit, with a thermal insulation blanket enclosing the heating element and conduit; whereby the hose has a predetermined heat loss characteristic through the insulation blanket and the fluid conduit has a predetermined heat absorption characteristic relative to the heating element. The system also includes a hose simulator physically separated from the hose, the hose simulator having a thermal insulation blanket with substantially the same heat loss characteristics as the hose thermal insulation blanket, with an electrically energizable heater and temperature sensor in a module enclosed by the thermal insulation blanket of the simulator, so as to provide substantially the same heat absorption characteristics between the electrically energizable heating element and the temperature sensor as are provided between the hose heating element and the conduit. An electrical power drive circuit is connected and parallel to the hose heating element and to the heating element in the hose simulator, and simultaneously energizes both heating elements; a control circuit is connected to the electrical power drive circuit for controlling its operation, and the control circuit has an input resistance bridge circuit which is electrically connected to the hose simulator temperature sensor, and has an ouput connected to the power drive circuit, for generating electrical power drive to the hose and hose simulator heating elements in response to temperature sensed within the hose simulator module. An ambient temperature sensor may also be utilized in the input resistance bridge circuit to cause the electrical power drive circuit to increase or decrease its electrical drive signal in accordance with a decrease or increase in ambient temperature.

BRIEF DESCRIPTION OF THE DRAWINGS

The invention and its operation are described herein, and with reference to the appended drawings, in which;

FIG. 2A shows an isometric view, in partial cutaway, of a typical hose construction; and FIG. 2B shows an isometric view, in partial cutaway, of the heating element construction; and FIG. 2C shows an electrical schematic of the hose heater; and FIG. 3 shows a cross section view of a hose simulator; and FIG. 4A shows a cross section view of a control module; and FIG. 4B shows a view taken along the lines 4B—4B of FIG. 4A.

DESCRIPTION OF THE PREFERRED EMBODIMENT

Figure 1:
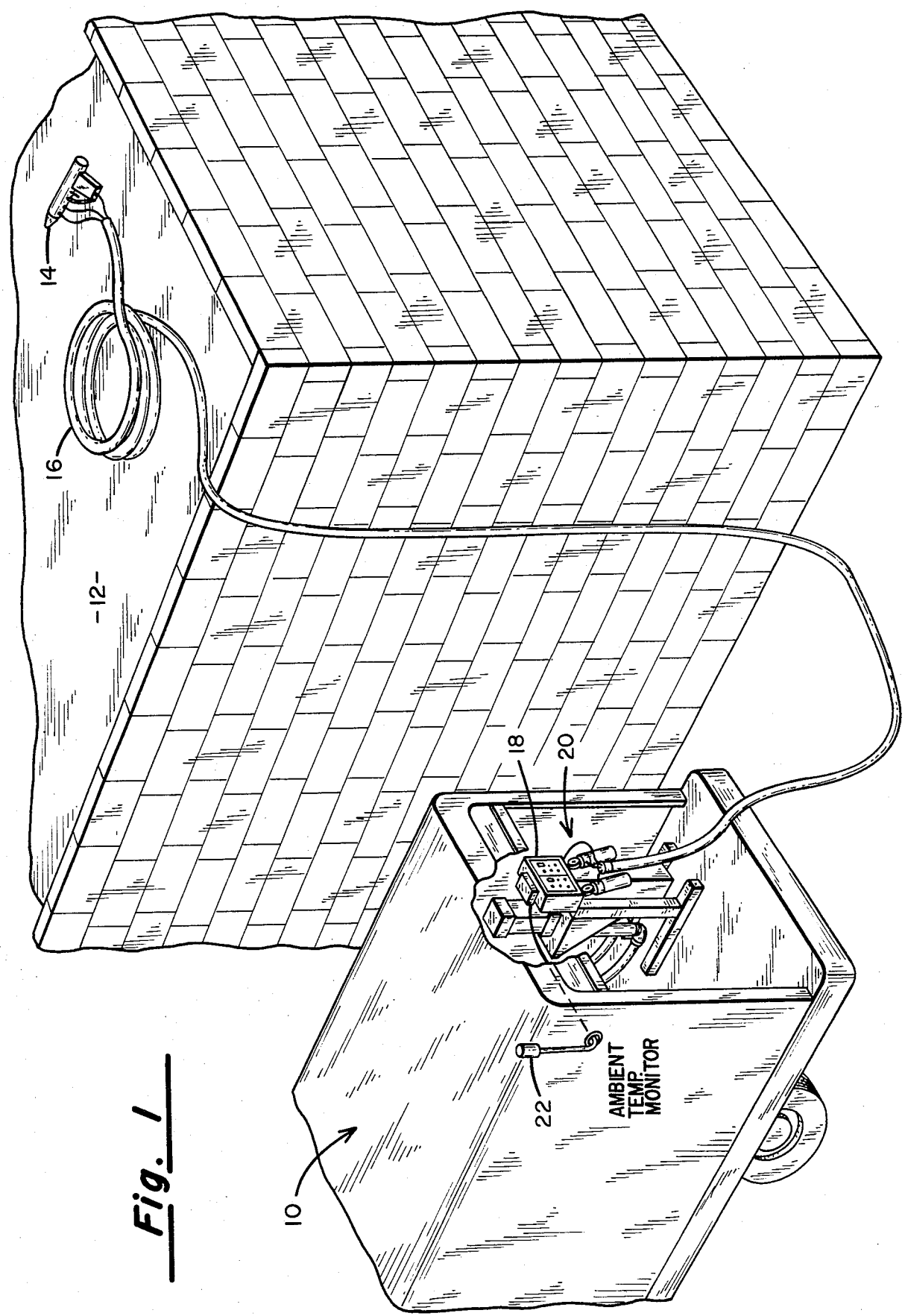
FIG. 1 shows an illustrative view of the invention in a typical construction.

Referring first to FIG. 1, there is shown an illustrative view of a typical application wherein the invention is used to advantage. A vehicle 10 is equipped to transport the invention and related equipment to a work site. In a typical application, the equipment might be used to apply a mixed, two-component foam material to a roof surface 12. The material is applied via a spray gun 14 which receives heated liquid components through a hose 16. Hose 16 receives its liquid components from a pumping system 20, which is typically mounted on vehicle 10. Pumping system 20 includes a temperature control 18 which houses a hose simulator, and an ambient temperature monitor 22 which is located so as to monitor the temperature in the vicinity of the point of application.

FIG. 2A shows a cutaway view of a section of one form of hose 16. An outer covering 24 serves to protect the hose and other inner components from damage caused by physical abuse. An insulation layer 26, preferably constructed from resilient plastic or rubber foam material, serves as an insulation blanket to provide temperature insulation for the components it encloses. One or more liquid component hoses 28 and 30 are contained inside of insulation layer 26, the hoses themselves being constructed of multiple layers of material for efficient operation. For example, hose 30 includes an outer covering 32, one or more braided layers 34 for strength and protection, and an inner tube 36 for conveying an application liquid. An air hose 38 is also contained within insulation layer 26. Air hose 38 delivers pressurized air to spray gun 14 to assist in the atomization of the liquid components in the spraying process. A heating tape 40 is contained within insulation layer 26, to generate the necessary heat energy for the operation of the invention. Heating tape 40 includes a pair of buss wires 41 and 42 for conducting the electrical energy in a manner to be hereinafter described. Heating tape 40 is preferably formed with an electrically grounded outer shield which will be described hereafter in more detail.

FIG. 2B shows an expanded and partial cutaway view of a type of heating tape 40. Heating tape 40 has an outer cover 43, which may include a grounded braid with an insulating layer. A heating element 44, preferably made from Nichrome wire is coiled about an insulating sheet 45. Heating element 44 extends throughout the length of heating tape 40. Heating element 44 is periodically electrically connected to buss wire 41 and 42, with alternate connections being made to these buss wires along predetermined lengths A of heating tape 40. These alternating connections are preferably made at about 24 inch intervals along heating tape 40.

FIG. 2C shows an electrical schematic of the connection between buss wires 41 and 42, and heating element 44. For example, heating element 44 is connected to buss wire 41 at point 46, and is next connected to buss wire 42 at point 48, which is a predetermined distance A along heating tape 40 from point 46. In this manner, a plurality of parallel electrical connections are constructed between heating element 44 and buss wires 41 and 42. When a voltage source 50 is connected across buss wires 41 and 42, a plurality of parallel current paths are provided between the buss wires and through respective sections of heating element 44. In another form of heated hose construction the heating wires may simply be constructed as a parallel or twisted pair of buss wires running the entire length of the hose section, with one or more heating wires also running the entire length of the hose section, where one buss wire is electrically connected to a heating wire at one end of the hose section and the other buss wire is electrically connected to the heating wire at the other end of the hose section. In this case the schematic representation of FIG. 2C indicates a length A corresponding to the length of a single hose section. Naturally, the type and size of heating wire selected for use in the heated hose is a function of the particular application design chosen.

FIG. 3 shows a side view in partial cross section of hose simulator 60. Hose simulator 60 includes an inner control module 62, which is wrapped in an insulation blanket 64. Insulation blanket 64 is preferably constructed of resilient foam material. The thickness of insulation blanket 64 is selected to provide the same or similar insulation characteristics as does the insulation covering of a section of hose. The overall objective of hose simulator 60 is to provide heat transfer characteristics which are matched to a section of heated hose 16. Insulation blanket 64 is closed about control module 62 at each of its ends, thereby forming a closed insulation compartment for control module 62.

FIG. 4A shows a cross section view of control module 62. A resistor 58 is potted into an epoxy compound 59, having each of its electrical connections respectively connected to wires 66 and 68 which extend external to the potted epoxy compound. Further, a temperature sensing element 70 is also rigidly held within the potting compound 59, having two electrical wires 72 and 74 extending external to the potted epoxy compound. Temperature sensor 70 is spaced away from resistor 58 by a predetermined distance, the distance being selected to provide a degree of heat correlation comparable to the rate at which the liquid hoses in the heated hose accept heat from the heating tape which is also within the heated hose. FIG. 4B shows a view taken along line 4—4 of FIG. 4A. Resistor 58 is proximately centered in potting compound 59, so as to equalize the temperature dissipation from resistor 58 through potting compound 59 when the resistor is energized electrically. It has been found preferable to utilize a resistor 58 valued at 20,000 ohms, having an 11 watt power capacity. In practice, the physical size of control module 62 has been found to match the heat transfer characteristics of hose 16 when control module 62 is approximately 1½ inches wide, 2½ inches high, and ½-¾ inch thick. Specific departures from these dimensions may be made to accommodate particular hose types, and of course are a function of the hose insulation, heating tape, and other variables, including the type and nature of the liquid fed through the hose.

Figure 5:
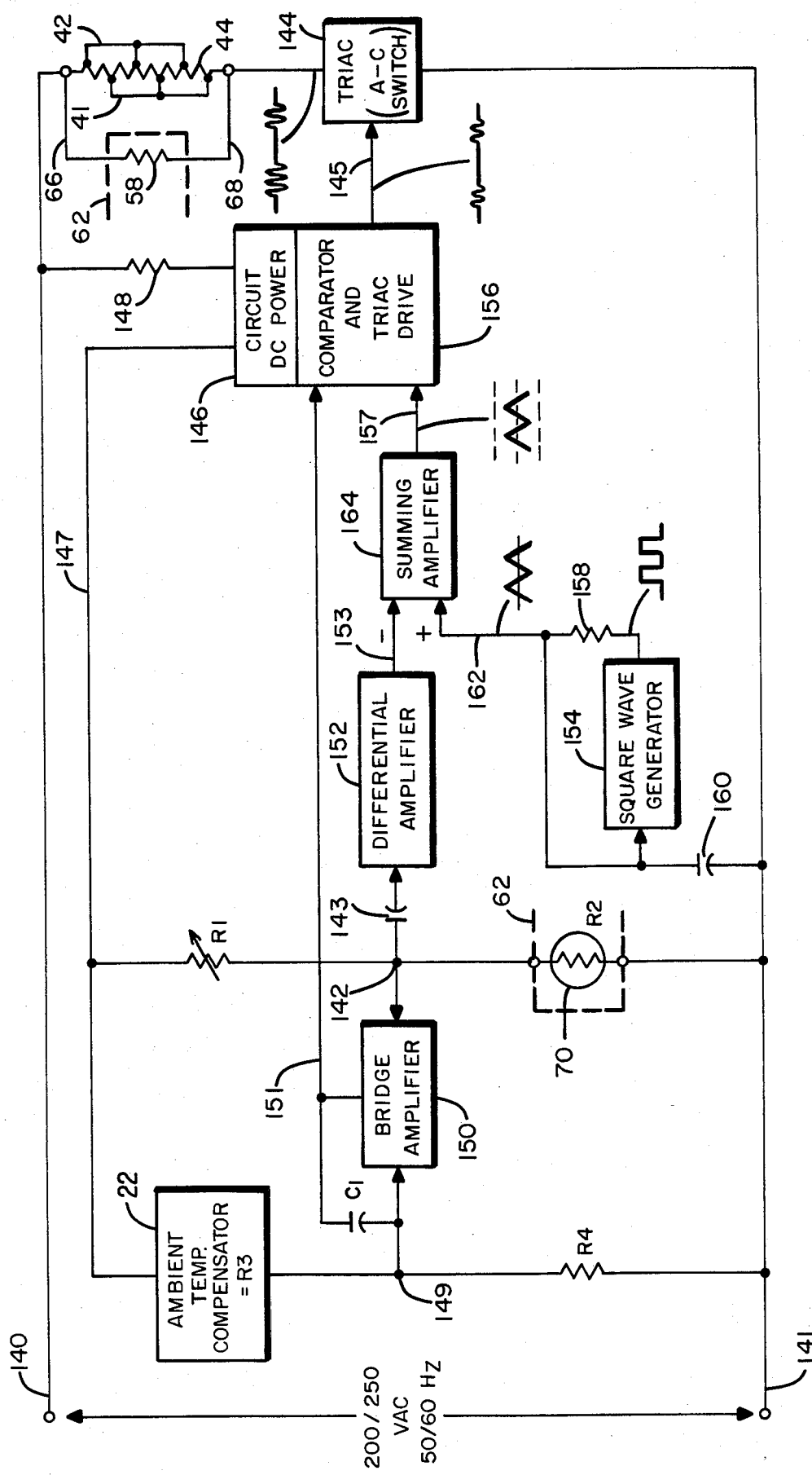
FIG. 5 shows a schematic block diagram of the temperature control circuit.

FIG. 5 shows a schematic block diagram of the temperature control circuit 18, and its connections to heating element 44 and resistor 58. Alternating current voltage is applied at power lines 140 and 141. This alternating current voltage may typically be 200/250 volts AC, at 50/60 hertz(Hz). AC power line 140 is wired to buss wire 42 which connects to heating element 44. Resistor 58 is electrically connected in parallel to the connections to heating element 44, so that when electrical power is applied to heating element 44 it is also applied to resistor 58. AC power line 141 is connected to triac circuit 144. Triac circuit 144 is an AC power switch, of a type well-known in the art. In the preferred embodiment triac 144 is manufactured by Raytheon Company, under type designation TAG 741. Triac circuit 144 has a control input line 145, the voltage signals appearing on input line 145 causing triac circuit 144 to turn "on" and "off" as a function of these input signals. AC power line 141 also serves as a circuit common or ground connection. Triac 144 is also connected to buss wire 41, to complete the electrical power connections to heating element 44.

Direct current power to operate the circuit shown on FIG. 5 is obtained through a circuit DC power supply 146, which receives its input power through dropping resistor 148, and a connection to circuit ground (not shown). DC power supply 146 provides a DC voltage in line 147 and other lines not shown, for operation of the circuits to be hereinafter described.

A resistance bridge circuit is formed by resistors $R_1$, $R_2$, $R_3$, and $R_4$, the function of which will now be described. Resistance $R_1$ is a variable resistance which functions to enable a manual setting of a desired setpoint temperature, and may be set by an operator to any predetermined desired temperature. Resistance $R_2$ (thermistor 70) is the temperature-variable resistior found in control module 62. Its resistance varies inversely with temperature, the resistance decreasing as the sensed temperature increases, and increasing as the sensed temperature decreases. Resistance $R_3$ is a temperature variant resistor, which may also be a thermistor, whose resistance values vary inversely with temperature, and which is located in ambient temperature monitor 22. Resistance $R_4$ is a fixed value resistance whose function is to provide a resistor balance point for resistance $R_3$. In practice, resistances $R_3$ and $R_4$ are selected so as to be equal in value at a nominal ambient temperature, i.e. about 80° F., so that the leg of the resistance bridge comprising resistors $R_3$ and $R_4$ is balanced at a nominal ambient temperature. Resistances $R_1$ and $R_2$ form the other balanced leg of the resistance bridge circuit. Resistor $R_2$ (thermistor 70) varies inversely with the temperature of the hose simulator 60, and resistance $R_1$ may be manually set to a value corresponding to a desired temperature setting of the fluid within hose 16. Resistances $R_2$ and $R_3$, in the preferred embodiment, are products manufactured by Victory Engineering Corp., Springfield, N.J., under type designation VECO T45A35.

The voltage at the junction point 142 of resistances $R_1$ and $R_2$ is direct-coupled into bridge amplifier 150, which generates an output signal in response to this voltage. The voltage at the junction point 149 of resistances $R_3$ and $R_4$ is also direct-coupled into bridge amplifier 150 in the same respect. The output signal from bridge amplifier 150 appears on line 151, and is a voltage representative of a signal commanding more or less heat from the heating element 44, the higher the voltage level on line 151 the longer will be the duty cycle of the AC power driving the heating element, and therefore the more heat will be commanded. This signal is fed into comparator and drive circuit 156 as one of two inputs received by that circuit. The second input into circuit 156 is a signal on line 157, which is a sawtooth voltage riding a DC voltage level. A 60 Hz output signal from circuit 156 will appear on line 145 at any time when the input signal on line 157 is at a lower voltage than the input signal on line 151. The signal on line 145 is used as a control signal input to triac circuit 144, effectively turning on triac circuit 144 to enable AC power to pass through the heating element and through resistor 58. FIG. 5 shows several voltage waveforms which may be found at the points indicated on the drawing.

A square wave generator 154 generates a repetitive signal having a period of approximately 1½ seconds. This square wave signal is passed through resistance/capacitance network comprising resistor 158 and capacitor 160. This network produces a sawtooth waveform appearing on line 162 as an input to summing amplifier 164. The sawtooth waveform on line 162 is referenced at a potential of 4 volts having equal portions (±1½ volts) of voltage swing about that voltage. A differential amplifier 152 has an input coupled to junction point 142 via a capacitor 143. Differential amplifier 152 reacts to changes in voltage at junction point 142, and the output of differential amplifier 152 is a signal on line 153 which is a DC voltage representative of the rate of change of voltage at point 142. The signal on line 153 is summed with the signal on line 162 by summing amplifier 164, and the output of summing amplifier 164 is therefore a sawtoothed voltage riding a DC level as has been hereinbefore described. It should be noted that the signal received by summing amplifier 164 from line 153 is received at an inverting (−) input terminal, whereas the signal received by summing amplifier 164 from line 162 is received at a noninverting (+) input terminal.

The components selected for the control circuit illustrated on FIG. 5 are all standard commercial components which are commonly available. For example, the power supply, comparator, and drive circuits 146 and 156 are in a single integrated circuit manufactured by RCA, under Type CA3058. The components making up bridge amplifier 150, differential amplifier 152, summing amplifier 164, and square wave generator 154 are all found in a single integrated circuit manufactured by National Semiconductor Company, as Type LM124. In the preferred embodiment resistor 158 has been selected to have a value of 150 kilohms (150 K), and capacitor 160 has been selected to have a value of 10 microfarads (uf). Similarly, capacitor 143 has a value of 11 uf, capacitor $C_1$ has a value of 50 uf, and resistor $R_4$ has a value of 47 K. Resistor $R_1$ is a variable potentiometer having a nominal range of values from 0 to 45 K.

In operation, resistor $R_1$ is nominally set by the operator to a setting representative of the desired hose liquid temperature. AC power is than applied to the circuit, and the circuit begins operating. Since the fluid temperature of hose simulator 60 is initially lower than the temperature setting of $R_1$, a relatively positive voltage will be present at point 142, which will be amplified by bridge amplifier 150 resulting in a positive voltage on line 151. Since the positive voltage on line 142 is initially unchanging, the output of differential amplifier 152 is initially zero, and the output of summing amplifier 164 is therefore a sawtooth waveform riding about a 4 volt level. To the extent the voltage on line 157 is lower than the voltage on line 151, circuit 156 will generate a 60 Hz output signal on line 145. The signal on line 145 will trigger triac circuit 144 to cause AC power to pass through heating element 44 and resistor 58. Initially, it may be presumed that the signal on line 157 is lower than the voltage on line 151 during almost the entire sawtooth period, resulting in a 60 Hz continuous output signal from circuit 156, and therefore resulting in a triggering of triac circuit 144 and applying AC power to heating element 44 and resistor 58. This causes the temperature in control module 62 to increase and brings about a decrease in the resistance of $R_2$. Therefore, the voltage at point 142 begins dropping at a rate consistent with the rise in temperature. Bridge amplifier 150 develops an output signal on line 151 which follows the change of voltage at point 142, but capacitor $C_1$ shunts any rapidly changing voltage, effectively desensitizing bridge amplifier 150 during times when the rate of change of temperature is rapid. Conversely, the rate of change of voltage at point 142 is sensed by differential amplifier 152 to generate a negative voltage on its output line 153. The voltage on line 153 is summed with the sawtoothed waveform on line 162 to generate a less negative-riding sawtoothed voltage on line 157. As the temperature within control module 62 reaches the nominal setpoint temperature, the voltage at point 142 becomes more negative and the output from bridge amplifier 150 becomes more negative. This results in the signal on line 151 dropping in magnitude and thereby decreasing the drive signal from circuit 156. This decreased drive signal results in a lowered duty cycle operation of triac 144, and gradually lowers the amount of AC power fed into heating element 44 and resistor 58. As the amount of AC power diminishes the rate of change of increase of heat sensed by resistor $R_2$ diminishes and differential amplifier 152 generates a less negative output signal, tracking this rate of change. This causes the output signal on line 153 to decrease towards zero, and summing amplifier 164 produces an output on line 157 which is a sawtooth voltage riding a DC level approaching the 4 volt bias line. This effectively removes differential amplifier 152 from the circuit and causes summing amplifier 164 to pass a sawtooth voltage to comparator and triac drive circuit 156. At the nominal temperature setpoint the rate of change of voltage at point 142 becomes zero or near zero, differential amplifier 152 generates a zero or near zero output signal on line 153, and summing amplifier 164 generates a sawtoothed waveform on line 157 which is referenced about the bias voltage reference. This is compared with the signal on line 151, resulting in approximately a 50% duty cycle operation of triac switch 144.

When temperatures within the control module 62 are at or near the nominal setpoint temperature the voltage on line 151 tracks these minor disparities, increasing or decreasing slightly the duty cycle of triac switch 144 to increase or decrease AC power applied to the heating element 44 and resistor 58 by the small additional amount needed to compensate for the temperature disparity. Under these conditions bridge amplifier 150 functions as a high gain amplifier, and small voltage changes at junction 142 produce significant corrective voltages at line 151. When wide disparities exist between the temperature setpoint and the actual temperature the circuit permits rapid heat buildup by tracking the rate of change of actual temperature versus setpoint temperature, thereby permitting the circuit to develop full power until actual temperature approaches nominal temperature settings. The output from bridge amplifier 150 is effectively desensitized by capacitor $C_1$, causing it to react with high sensitivity toward slowly varying temperature disparities, and with lower sensitivity towards rapidly varying temperature disparities. Conversely, the output from differential amplifier 152 causes it to react only toward rapidly varying temperature disparities, to control the triac switch 144 duty cycle when such temperature disparities exist.

All of the foregoing description presumes that a resistance balance exists between fixed resistor $R_4$ and ambient temperature sensing resistance $R_3$, which would be the case if the outdoor ambient temperature in the vicinity of ambient temperature monitor 22 is about 80° F. If the ambient temperature is higher than about 80° F., the voltage at junction 149 is relatively more positive, resulting in a more positive voltage being coupled to the second input terminal of bridge amplifier 150. Bridge amplifier 150 is a circuit which amplifies the difference signal sensed between its two input terminals, which means that when the ambient temperature is warmer than about 80° F. bridge amplifier 150 will generate a relatively lesser output signal on line 151 for a given temperature sensed by control module 62. Conversely, when the outdoor ambient temperature is lower than about 80° F., bridge amplifier 150 will generate a relatively higher output signal on line 151 for a given temperature sensed by control module 62. The net effect of all this is to cause temperature control circuit 18 to generate relatively more heating power on a cold day and relatively less heating power on a warm day.

The heat transfer characteristics of hose simulator 60 are selected so as to match as nearly as possible the heat transfer characteristics of a section of hose 16 having a length A. Under these conditions, even though it is only the temperature of hose simulator 60 which is monitored and controlled, it may be presumed that the temperature of a section of hose 16 tracks the temperature of hose simulator 60 nearly identically.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A system for electrically heating fluid hose for transporting one or more fluid components from a supply to a remote point of application, comprising
    (a) a hose having an electrically energizable heating element, and having at least one fluid conduit in close physical proximity to said heating element, and having a thermal insulation blanket enclosing all of said heating element and said at least one fluid conduit, said hose having predetermined heat loss characteristics through said insulation blanket, and said at least one fluid conduit having predetermined heat absorption characteristics from said heating element;
    (b) a hose simulator physically separated from said hose, said simulator having a thermal insulation blanket for providing substantially the same heat loss characteristics as is provided by said hose thermal insulation blanket, and having a module enclosed within said hose simulator thermal insulation blanket, said module having therein electrically energizable means for heating and means for sensing temperature, said means for sensing temperature having resistance characteristics variable with temperature, and being positioned in said module relative to said means for heating so as to provide substantially the same heat absorption characteristics between said means for heating and said means for sensing temperature as are provided between said hose heating element and said at least one fluid conduit;

(c) an electrical power drive circuit connected in parallel to said hose heating element and to said hose simulator means for heating for simultaneously energizing said heating element and said means for heating with the same power drive voltage; and (d) a control circuit connected to said electrical power drive circuit for controlling operation thereof in accordance with the temperature of said hose simulator as sensed by said means for sensing temperature, said control circuit including a resistance bridge circuit wherein said means for sensing temperature forms the input of the bridge circuit, and an output of the bridge circuit is connected to said power drive circuit, and the power drive circuit including means responsive to the output of said bridge circuit for controlling operation of said power drive circuit in response to the temperature sensed by said means for sensing temperature.

2. The apparatus of claim 1, wherein said control circuit further comprises an amplifier having two inputs and including means for amplifying the voltage difference of signals presented at said two inputs; and further comprising said resistance bridge circuit having first and second series resistors and means for connecting one of said amplifier inputs intermediate said first and second resistors, said resistance bridge circuit further having third and fourth series resistors and means for connecting the other amplifier input intermediate said third and fourth resistors; wherein said hose simulator means for sensing temperature further comprises a temperature responsive resistor forming said fourth resistor.

3. The apparatus of claim 2, wherein said resistance bridge circuit third resistor further comprises a manually adjustable resistor for adjusting the operating temperature of said bridge circuit.

4. The apparatus of claim 3, wherein said resistance bridge circuit first resistor further comprises a temperature sensitive resistor physically separated from said hose and module to be responsive to ambient temperature external said hose, and said resistance bridge circuit second resistor further comprises a fixed resistor which is not temperature responsive.

5. A fluid delivery system for transporting heated fluids through a hose and for monitoring and controlling the fluid temperature in said hose, comprising (a) a length of fluid hose having an electric heating element in close physical association therewith, said heating element extending along a predetermined length of said hose and having a pair of power drive terminals, and a thermal insulation blanket enclosing said fluid hose and said heating element, said insulation blanket having predetermined heat loss characteristics;

(b) a power drive circuit having output terminals connected to said power drive terminals, said power drive circuit having a resistance bridge circuit comprising a first resistance branch having first and second series resistors and a second resistance branch having third and fourth series resistors, said first and second resistance branches being connected in parallel, said power drive circuit including means for supplying variable power to said output terminals in response to temperature induced resistance changes in said bridge circuit;

(c) a closed module physically separate from said hose and enclosed in a thermal insulation blanket having substantially the same heat loss characteristics as said insulation blanket enclosing said fluid hose and heating element, said module having therein a power resistor connected to said power drive circuit output terminals and in parallel with said electric heating element of said hose, a temperature responsive resistance physically separate from said power resistor and comprising said bridge circuit fourth resistor; said temperature responsive resistance being positioned in said module relative to said power resistor so as to provide substantially the same heat absorption characteristics between said temperature responsive resistance and said power resistor as are provided between said hose heating element and said fluid hose;

(d) a manually variable resistor for adjusting the response temperature of said bridge circuit comprising said bridge circuit third resistor;

(e) a temperature responsive resistor comprising said bridge circuit first resistor, said temperature responsive resistor being physically separate from said hose and said closed module and arranged to be responsive to ambient temperature; and (f) a fixed value resistor comprising said bridge circuit second resistor.

* * * * *